United States Patent [19]

Hollstein et al.

[11] Patent Number: 5,362,694
[45] Date of Patent: Nov. 8, 1994

[54] SULFUR DIOXIDE REGENERATION OF SUPERACID CATALYST

[75] Inventors: Elmer J. Hollstein, Wilmington, Del.; Chao-Yang Hsu, Media, Pa.

[73] Assignee: Sun Company, Inc. (R&M), Philadelphia, Pa.

[21] Appl. No.: 39,716

[22] Filed: Mar. 30, 1993

[51] Int. Cl.$^5$ ............... B01J 27/30; B01J 31/12; C07C 5/13
[52] U.S. Cl. ............... 502/52; 502/38; 585/750
[58] Field of Search ............... 502/38, 52

[56] References Cited

U.S. PATENT DOCUMENTS

| | | | |
|---|---|---|---|
| 2,772,947 | 12/1956 | Sowerwine Jr. | 502/38 |
| 4,394,247 | 7/1983 | Olah | 208/419 |
| 4,918,041 | 4/1990 | Hollstein et al. | 502/217 |
| 4,956,519 | 9/1990 | Hollstein et al. | 585/751 |
| 5,036,035 | 7/1991 | Baba et al. | 502/217 |
| 5,182,247 | 1/1993 | Kuhlman et al. | 502/217 |

FOREIGN PATENT DOCUMENTS 269149  7/1970  U.S.S.R. ............... 502/38

Primary Examiner—Paul E. Konopka
Attorney, Agent, or Firm—Q. Todd Dickinson; Stephen T. Falk

[57] ABSTRACT

A process for regeneration of spent sulfated and calcined solid superacid catalyst is disclosed. Said process comprises heating said catalyst to a temperature of approximately 450° C. and contacting said catalyst with a gas stream comprising oxygen or air and sulfur dioxide. This regeneration process can be performed in situ.

29 Claims, 1 Drawing Sheet

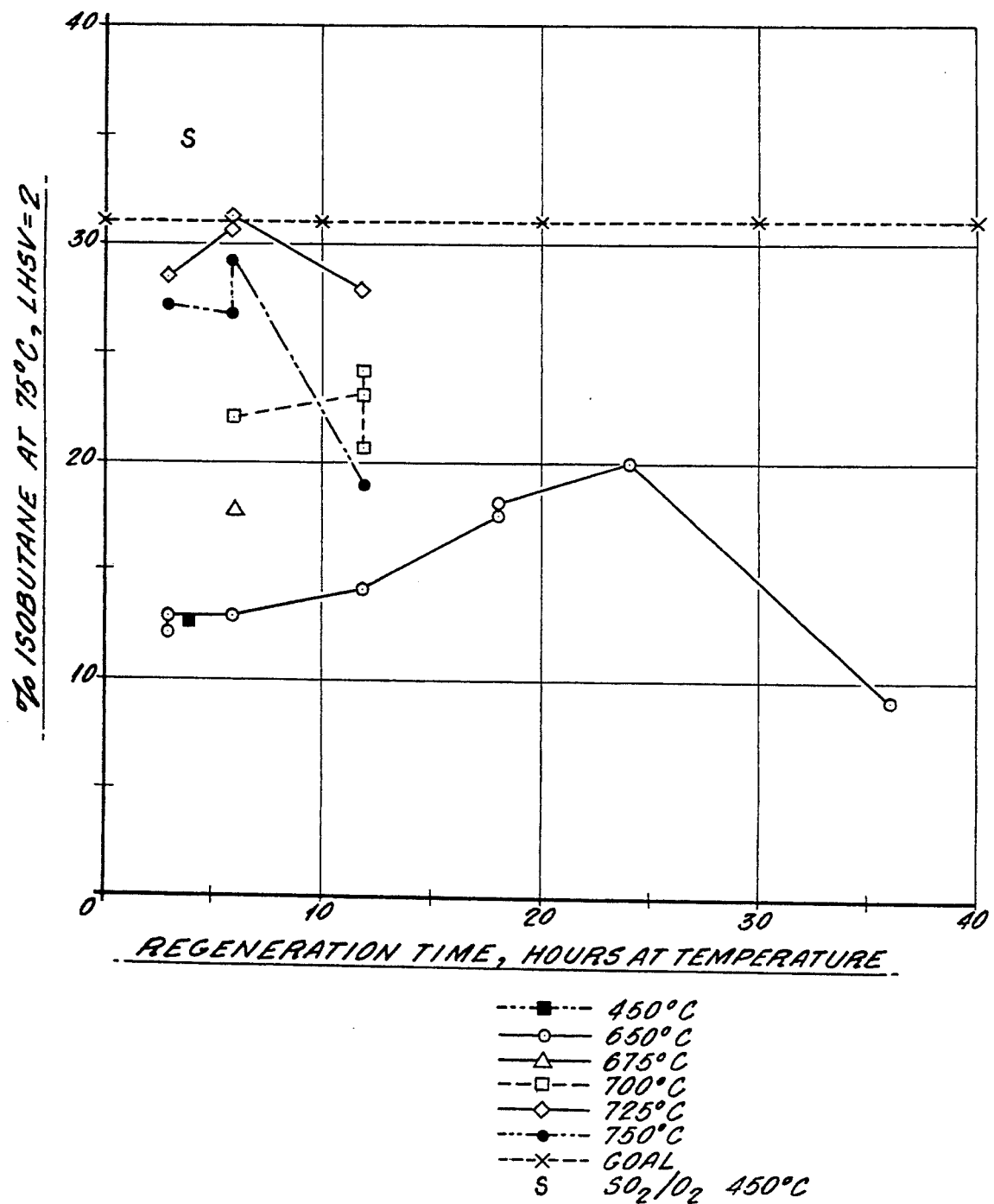

SULFUR DIOXIDE REGENERATION OF SUPERACID CATALYST

BACKGROUND OF THE INVENTION

This invention relates to a method for regeneration of used solid superacid catalysts by heating the catalyst and exposing the heated catalyst to a gas stream comprising air and sulfur dioxide. This method finds particular use in the regeneration of sulfated and calcined solid superacid catalysts.

BACKGROUND OF THE ART

The ability to regenerate sulfated and calcined solid superacid catalyst in an efficient manner is an important goal of catalysis research. Solid super acid catalysts, such as those disclosed in Hollstein et al. U.S. Pat. 4,918,041 and Hollstein et al. U.S. Pat. No. 4,956,519, are useful in the alkylation and isomerization of normal alkanes to produce high octane number blending components for motor fuels and/or valuable chemical intermediates.

The conventional method for the regeneration of catalyst activity involves heating the catalyst in a stream of gas containing a controlled amount of oxygen. The regeneration temperature is maintained such that it is high enough to burn off the carbonaceous deposits accumulated on the used catalyst, yet low enough not to melt or otherwise physically damage the catalyst itself.

At a given temperature and pressure, the concentration of oxygen is inversely related to the generation of carbon monoxide. Because the oxygen concentration is limited during catalyst regeneration, carbon monoxide is formed in the gas stream. Carbon monoxide can reduce the sulfate groups or the metal oxides of the catalyst. Because those groups are believed to be active sites of the catalyst, their reduction by CO reduces the activity of the catalyst. Higher temperatures, which would favor the production of carbon dioxide over carbon monoxide and thereby minimize reduction of catalyst sites, could physically damage the catalyst or the reactor vessel.

The process of the present invention solves this problem involving the regeneration of sulfated catalysts by heating the catalyst in a gas stream comprising air and sulfur dioxide. The sulfur dioxide is believed to form an equilibrated mixture of sulfur dioxide ($SO_2$) and sulfur trioxide ($SO_3$) which serve to reactivate sulfate sites on the catalyst which were reduced by carbon monoxide in the gas stream. This presence of sulfur dioxide in the gas stream, therefore, allows the regeneration reaction to be run at a considerably lower temperature than conventional processes, minimizing catalyst damage.

SUMMARY OF THE INVENTION

The present invention comprises a method for the regeneration of used sulfated catalysts and particularly sulfated and calcined solid superacid catalysts. It is known in the art to regenerate catalyst by gradually heating the catalyst to 350° to 450° C. in an inert atmosphere, for example nitrogen gas; adding air or $O_2$ to the inert atmosphere at a concentration of 0.5 to 1.0% $O_2$; and then gradually increasing the air or $O_2$ content in the gas stream until the $O_2$ concentration is approximately 21%. Those pre-processing steps are believed to burn off carbonaceous deposits on the catalyst. The process of the present invention adds to the pre-processing steps outlined above the step of introducing $SO_2$ to the oxygen-rich gas stream to a desired concentration. Preferably, this final step is performed at approximately 450° C. at approximately 1 atmosphere pressure while exposing the heated catalyst to a gas stream comprising oxygen and approximately 10% sulfur dioxide. This regeneration process can be performed in situ.

The process of the present invention is particularly suited for the regeneration of sulfated and calcined solid superacid catalysts comprising (1) oxide or hydroxide of an element from a first class consisting of Group III or Group IV elements; (2) oxide or hydroxide of metal from a second class consisting of Group V, Group VI or Group VII metals; and (3) oxide or hydroxide of Group VIII metal. In particular, the process is useful for the regeneration of catalysts where the Group IV element is zirconium, i.e. sulfated and calcined solid superacid zirconia catalysts.

BRIEF DESCRIPTION OF THE DRAWINGS

The FIGURE shows the effect of time and temperature on the regeneration of superacid ziconia catalyst measured as a function of the average weight percent of isobutane produce at 75° C. at a liquid hourly space velocity of 2.

DETAILED DESCRIPTION OF INVENTION

The regeneration of sulfated catalysts where catalyst sites are reduced by CO during burning of carbon has been problematic because of the concomitant reduction of sulfate groups and metal oxides caused by conventional regeneration techniques. The goal of the present invention is to regenerate sulfated catalysts, particularly sulfated and calcined solid superacid catalysts, in a single operation without the need to either separately reoxidize existing sulfate groups and metal oxides of the catalyst or re-sulfate the catalyst.

Regeneration Gas Stream

The process of the present invention starts with the standard technique of gradually heating the catalyst to 350° to 450° C. in an inert atmosphere, for example nitrogen gas; adding air or $O_2$ to the inert atmosphere at a concentration of 0.5 to 1.0% $O_2$; and then gradually increasing the air or $O_2$ content in the gas stream until the $O_2$ concentration is approximately 21%. In addition to those pre-processing steps to remove carbonaceous deposits from the used catalyst, the present invention involves the step of heating used catalyst in the presence of a gas stream comprising air or molecular oxygen and sulfur dioxide. The concentration of sulfur dioxide in the gas stream should be in the range of 1 to 20% by volume, preferably approximately 10% by volume. Sulfur dioxide itself can be introduced into the gas stream directly.

However, as an alternative, ammonium sulfate, hydrogen sulfide, mercaptans, sulfur trioxide, elemental sulfur and other suitable sulfur-containing reagents can serve as the source of the sulfur dioxide in the gas stream. These compounds are converted to $SO_2$ when introduced into the regeneration gas stream under the temperature and pressure parameters of this regeneration process. When suitable sulfur containing reagents are used, sufficient amounts are needed to result in a concentration of approximately 10% $SO_2$ in the gas stream.

Regeneration Reaction Parameters

During regeneration, the temperature of the reactor containing used catalyst should be maintained in the range of 400° to 750° C., preferably 425° to 475° C., more preferably at approximately 450° C., at a pressure of at least 1 atmosphere. The process conditions should be maintained for 0.5 to 24 hours, preferably 4 to 6 hours, more preferably approximately 4 hours. During this time, the catalyst is contacted with the regeneration gas comprising air or $O_2$ and 1 to 20% sulfur dioxide, preferably approximately 10% $SO_2$.

Because of the comparatively low regeneration reaction temperatures used in the process of the present invention, the process can be preferentially carried out in situ. This has the advantage of eliminating the need to remove the catalyst and then recharge it to the reaction vessel after regeneration.

Catalysts

The catalysts which have been found to be suitable to regeneration by the process of the present invention comprise sulfated catalysts, particularly sulfated and calcined solid superacid catalysts. Catalysts of this type have been described in Hollstein et al. U.S. Pat. No. 4,918,041 and Hollstein et al. U.S. Pat. No. 4,956,519 both of which are incorporated herein by reference.

The process of the present invention is particularly suited for the regeneration of sulfated and calcined solid superacid catalysts comprising a mixture of (1) oxide or hydroxide of an element from a first class consisting of Group III or Group IV elements; (2) oxide or hydroxide of metal from a second class consisting of Group V, Group VI or Group VII metals; and (3) oxide or hydroxide of Group VIII metal.

In one preferred embodiment of the invention, the process has been shown to be particularly useful for the regeneration of catalysts where the Group IV element is zirconium i.e. sulfated and calcined solid superacid zirconia catalysts.

The following example illustrates the invention:

EXAMPLE

A superacid zirconia catalyst was prepared by impregnating zirconium hydroxide with a mixture of iron nitrate, manganese nitrate and ammonium sulfate and then calcining the composition at 725° C. The catalyst was prepared substantially as described in Hollstein et al. U.S. Pat. No. 4,918,041 and Hollstein et al. U.S. Pat. No. 4,956,519.

The isomerization of normal butane (n-butane) was catalyzed by this superacid zirconia catalyst in a reactor vessel charged with catalyst. The reactor was run at increasing temperatures until the conversion of n-butane to isobutane fell to less than 35% or the reaction temperature exceeded the critical temperature of the appropriate mixture of n-butane and isobutane. The reaction was carried out at temperatures between 30 and 135° C.

The catalyst was then regenerated by passing a nitrogen gas stream containing controlled amounts of oxygen through the catalyst at a final regeneration temperature of 450° C. concentration of $O_2$ used in the nitrogen gas stream was in the range of 0.5 to 20% and was controlled by the temperature of the catalyst. Catalyst samples were tested before and after regeneration in laboratory reaction vessel.

The test runs were repeated for seven cycles of reaction and regeneration. Six regeneration cycles were completed successfully with oxygen gas stream. However, after the seventh cycle, the superacid zirconia catalyst could not be regenerated at 450° C. as described above, apparently because the catalyst had been damaged by reduction of catalyst sulfate or metal oxide groups. It was subsequently determined that temperatures in excess of 450° C. were required to regenerate the catalyst with a $N_2/O_2$ gas stream.

Samples of damaged catalyst were further analyzed in a laboratory reaction vessel. Regeneration was carried out with air as the regeneration gas at temperatures ranging from 450° C. to 750° C. The results of these regenerations were compared to those obtained by the process of the present invention using air plus 10% $SO_2$. All of these results are illustrated in the Figure.

The degree of catalyst regeneration was assessed by measuring the isomerization activity of regenerated catalyst and comparing the activity to that of fresh catalyst. Catalyst activity was defined as the average weight percent isobutane ($iC_4$) produced at 75° C. at liquid hourly space velocity of 2 (LHSV=2). The desired level of catalytic isomerization activity is 31 wt.% isobutane or more.

As shown by the FIGURE, regeneration with a gas stream comprising $O_2$ and 10% $SO_2$ for 4 hours at 450° C. resulted in a catalyst having activity in excess of the goal (31 wt.%), as defined above. Sulfur dioxide regenerated superacid zirconia catalyst had an isomerization rate of approximately 35 wt.% in 4 hours at 75° C. at LHSV=2. Without $SO_2$, regeneration with $O_2$ alone required a temperature as high as 725° C. for over 6 hours to approach an acceptable degree of regeneration.

At high regeneration temperatures (e.g. 725° C. and 750° C., the catalyst is damaged, as evidenced by the diminished isomerization activity of the catalyst when regeneration was carried out at such temperatures for over 6 hours. At 450° C. regeneration with $O_2$ alone yielded only approximately 13 wt. % isobutane isomerization after 4 to 6 hours.

The data illustrated in the FIGURE clearly show the superior regenerative effect of the process of the present invention. Addition of approximately 10% $SO_2$ to the $O_2$ regeneration gas stream produced greater regeneration in a shorter time and at a far lower temperature. In addition to being a more efficient regeneration process, $SO_2$ regeneration

TABLE

Catalyst Activity Measured As Average Weight Percent Isobutane ($iC_4$) Produced At LHSV = 2

| Isomerization Reaction Temp. °C. | $iC_4$ Production w/ Fresh Catalyst Treated 6 Hours at 450° C. in Air | $iC_4$ Production with Used Catalyst Treated 4 Hours at 450° C. with 10% $SO_2$ in Air |
|---|---|---|
| 30 | 2.94 | 5.39 |
| 45 | 7.59 | 12.16 |
| 60 | 16.10 | 21.58 |
| 75 | 30.11 | 34.88 |
| 90 | 47.19 | 46.11 | provides the advantage of in situ regeneration due to the lower temperature requirement of the process. At a temperature of 725° C., regeneration must be carried out in an external kiln and catalyst must subsequently be recharged to the reactor.

The effective regenerative properties of the present invention are also evident when regenerated catalyst is used in isomerization reactions at temperatures other than 75° C. As shown in the Table, $SO_2$ regenerated superacid zirconia catalyst has greater activity than $O_2$-treated fresh catalyst at isomerization temperatures of 30° C., 45° C. and 60° C. and 75°. And 90° C., the activity level of $O_2$-treated fresh catalyst and $SO_2$ regenerated catalyst were comparable.

What is claimed is:

1. A process for regenerating used solid superacid catalyst containing sulfate groups and carbonaceous deposits, which process comprises the steps of:
    (a) heating said catalyst; and
    (b) contacting said catalyst with a gas stream comprising:
        (1) air or oxygen; and
        (2) a sulfur-containing reagent; under reaction conditions sufficient to reoxidize reduced sulfate groups of said catalyst to sulfate groups.

2. The process of claim 1 wherein said catalyst comprises solid superacid isomerization catalyst.

3. The process of claim 1 wherein said catalyst comprises solid superacid alkylation catalyst.

4. The process of claim 1 wherein said catalyst comprises a sulfated and calcined mixture of:
    (a) oxide or hydroxide of element from a first class consisting of Group III or Group IV elements;
    (b) oxide or hydroxide of metal from a second class consisting of Group V, Group VI or Group VII metals; and
    (c) oxide or hydroxide of Group VIII metal.

5. The process of claim 4 wherein said element from said first class is zirconium.

6. The process of claim 1 wherein said reagent is selected from the group consisting of sulfur dioxide, ammonium sulfate, hydrogen sulfide, sulfur trioxide, mercaptans and elemental sulfur.

7. The process of claim 6 wherein said reagent is sulfur dioxide.

8. The process of claim 1 wherein the concentration of reagent is sufficient to result in a sulfur dioxide concentration in said gas stream of 1 to 20% by volume.

9. The process of claim 8 wherein said concentration is approximately 10%.

10. The process of claim 1 wherein said reaction conditions comprise temperature in the range of 400° to 750° C. and pressure of at least one atmosphere.

11. The process of claim 10 wherein said temperature is in the range of 425°°to 475° C.

12. The process of claim 11 wherein said temperature is approximately 450° C.

13. The process of claim 1 wherein said reaction conditions are maintained for 0.5 to 25 hours.

14. The process of claim 13 wherein said conditions are maintained for 4 to 6 hours.

15. The process of claim 14 wherein said conditions are maintained for approximately 4 hours.

16. The process of claim 1 wherein said regeneration process is performed in situ.

17. The process of claim 1 further comprising subjecting said catalyst to pre-processing conditions to remove said carbonaceous deposits from said catalyst, said pre-processing conditions comprising heating said catalyst to 350° to 450° C. in an inert atmosphere and gradually adding air or oxygen to said inert atmosphere until the concentration of oxygen is approximately 21%.

18. A process for regeneration of used catalyst comprising the steps of heating said catalyst to a temperature in the range of 400° to 750° C. at pressure greater than or equal to 1 atmosphere; and contacting said catalyst with a gas stream comprising: (1) air or $O_2$ and (2) sulfur dioxide; wherein said catalyst comprises a sulfated and calcined solid superacid comprising a mixture of:
    (a) oxide or hydroxide of element from a first class consisting of Group III or Group IV elements;
    (b) oxide or hydroxide of metal from a second class consisting of Group V, Group VI or Group VII metals; and
    (c) oxide or hydroxide of Group VIII metal.

19. The process of claim 18 wherein said temperature is in the range of 425° to 475° C.

20. The process of claim 19 wherein said temperature is approximately 450° C.

21. The process of claim 18 wherein the concentration by volume of sulfur dioxide in said gas stream is 1 to 20%.

22. The process of claim 21 wherein said concentration of sulfur dioxide is approximately 10%.

23. The process of claim 18 wherein said sulfur dioxide is generated in said gas stream from sulfur-containing reagent selected from the group consisting of ammonium sulfate, hydrogen sulfide, mercaptans, sulfur trioxide and elemental sulfur.

24. The process of claim 23 wherein the concentration of said sulfur-containing reagent is sufficient to result in a sulfur dioxide concentration in said gas stream of approximately 10%.

25. The process of claim 18 wherein said regeneration process conditions are maintained for 0.5 to 24 hours.

26. The process of claim 25 wherein said regeneration process conditions are maintained for 4 to 6 hours.

27. The process of claim 26 wherein said regeneration process conditions are maintained for approximately 4 hours.

28. The process of claim 18 wherein said regeneration process is performed in situ.

29. The process of claim 18 further comprising subjecting said catalyst to pre-processing conditions to remove said carbonaceous deposits from said catalyst, said pre-processing conditions comprising heating said catalyst to 350° to 450° C. in an inert atmosphere and gradually adding air or oxygen to said inert atmosphere until the concentration of oxygen is approximately 21%.

* * * * *